US009969650B2

United States Patent
Ebner et al.

(10) Patent No.: US 9,969,650 B2
(45) Date of Patent: May 15, 2018

(54) BATCH FOR PRODUCTION OF A REFRACTORY MAGNESIA-CARBON PRODUCT OR A REFRACTORY ALUMINA-MAGNESIA-CARBON PRODUCT, A PROCESS FOR THE PRODUCTION OF A PRODUCT OF THIS TYPE, A PRODUCT OF THIS TYPE AS WELL AS THE USE OF A PRODUCT OF THIS TYPE

(71) Applicant: Refractory Intellectual Property GmbH & Co. KG, Vienna (AT)

(72) Inventors: Clemens Ebner, Graz (AT); Bernd Neubauer, Leoben (AT); Andreas Rief, Leoben (AT); Alexander Maranitsch, Vienna (AT); Bernd Trummer, Graz (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days. days.

(21) Appl. No.: 15/511,473

(22) PCT Filed: Jun. 29, 2015

(86) PCT No.: PCT/EP2015/064679
§ 371 (c)(1),
(2) Date: Mar. 15, 2017

(87) PCT Pub. No.: WO2016/050376
PCT Pub. Date: Apr. 7, 2016

(65) Prior Publication Data
US 2017/0305795 A1    Oct. 26, 2017

(30) Foreign Application Priority Data

Oct. 1, 2014  (EP) ..................................... 14187322

(51) Int. Cl.
*C04B 35/05*       (2006.01)
*C04B 35/107*     (2006.01)
(Continued)

(52) U.S. Cl.
CPC ............ *C04B 35/107* (2013.01); *C04B 35/05* (2013.01); *C04B 35/6303* (2013.01);
(Continued)

(58) Field of Classification Search
CPC ........ C03B 35/013; C08L 61/24; C08L 67/08; C08L 95/00; C08L 2666/02
See application file for complete search history.

(56) References Cited

U.S. PATENT DOCUMENTS 3,903,025 A * 9/1975 Farrington ............ C04B 35/013
106/38.25
4,618,079 A * 10/1986 Barnes ................... B22D 41/02
222/591

(Continued)

FOREIGN PATENT DOCUMENTS

EP         1873128 A1    1/2008

OTHER PUBLICATIONS

Bag, Mousom, "Developement of Environment Friendly New Generation MgO—C Brick Using Nano Carbon", Master of Technology in Ceramic Engineering Thesis, 2011, 95 pages.
(Continued)

*Primary Examiner* — Noah S Wiese
(74) *Attorney, Agent, or Firm* — Medley, Behrens & Lewis, LLC

(57) ABSTRACT

The invention concerns a batch for the production of a refractory magnesia-carbon product or a refractory alumina-magnesia-carbon product, a process for the production of a refractory magnesia-carbon product or a refractory alumina-magnesia-carbon product, a refractory magnesia-carbon product or a refractory alumina-magnesia-carbon product as well as the use of a magnesia-carbon product or a refractory alumina-magnesia-carbon product.

8 Claims, 15 Drawing Sheets

(51) Int. Cl.
*C04B 35/63* (2006.01)
*C04B 35/634* (2006.01)
*C04B 35/64* (2006.01)

(52) U.S. Cl.
CPC ............ *C04B 35/634* (2013.01); *C04B 35/64* (2013.01); *C04B 2235/3206* (2013.01); *C04B 2235/3217* (2013.01); *C04B 2235/425* (2013.01); *C04B 2235/48* (2013.01); *C04B 2235/602* (2013.01)

(56) References Cited

U.S. PATENT DOCUMENTS

| | | | | |
|---|---|---|---|---|
| 4,912,068 | A | * | 3/1990 | Michael ................ C04B 35/013 266/280 |
| 5,262,367 | A | * | 11/1993 | Sundell ................ C04B 35/013 266/280 |
| 5,512,316 | A | * | 4/1996 | Dody ..................... B22D 41/02 427/140 |
| 5,632,326 | A | * | 5/1997 | Gough ................... B22C 9/084 164/359 |
| 5,866,490 | A | | 2/1999 | Watanabe et al. |
| 7,772,145 | B2 | * | 8/2010 | Aneziris ............... C04B 35/013 106/273.1 |

OTHER PUBLICATIONS

Aneziris, et al., "Magnesia-Carbon Bricks—A High Duty Refractory Material", In Refractories Manual 2003, Interceram, Jan. 1, 2003, pp. 22-27.

Kanno, et al., "Mesophase Pitch and Phenolic Resin Blends as Binders for Magnesia-Graphited Bricks", In Carbon, vol. 37, Feb. 1, 1999, pp. 195-201.

* cited by examiner

BATCH FOR PRODUCTION OF A REFRACTORY MAGNESIA-CARBON PRODUCT OR A REFRACTORY ALUMINA-MAGNESIA-CARBON PRODUCT, A PROCESS FOR THE PRODUCTION OF A PRODUCT OF THIS TYPE, A PRODUCT OF THIS TYPE AS WELL AS THE USE OF A PRODUCT OF THIS TYPE

The invention relates to a batch for the production of a refractory magnesia-carbon product or a refractory alumina-magnesia-carbon product, to a process for the production of a refractory magnesia-carbon product or a refractory alumina-magnesia-carbon product, to a refractory magnesia-carbon product or a refractory alumina-magnesia-carbon product and to the use of a magnesia-carbon product or a refractory alumina-magnesia-carbon product.

The term "refractory product" as used in the context of the invention denotes in particular refractory ceramic products with a service temperature of more than 600° C., and preferably refractory substances in accordance with DIN 51060, i.e. substances with a pyrometric cone equivalent of more than SK17. In particular, the pyrometric cone equivalent may be determined in accordance with DIN EN 993-12.

As is known, a "batch" describes a composition of one or more components from which a refractory product can be produced by means of a heat treatment, i.e. in particular by means of firing.

Refractory products are also known in the form of magnesia-carbon products, which are also known as MgO—C products or MgO—C bricks, as well as in the form of refractory alumina-magnesia-carbon products, which are also known as AMC products or AMC bricks. In the fired refractory magnesia-carbon product and alumina-magnesia-carbon product, carbon bonding prevails, via which the base component of the product is bonded together. In some products, a mixture of carbon bonding and ceramic bonding is present (so-called CBMC bricks, Ceramically Bonded MgO—C bricks). Compared with pure MgO products or pure magnesia-alumina products, magnesia-carbon products and alumina-magnesia-carbon products in particular exhibit improved wear characteristics as well as an improved resistance to thermal shock. Magnesia-carbon products and alumina-magnesia-carbon products will also be referred to collectively as refractory carbon-bonded products.

Refractory carbon-bonded products are produced from batches which comprise carbon-containing components which, when heat is applied to a batch of this type, results in carbon bonding.

In addition to a base component, the essential components of a batch for the production of a refractory carbon-bonded product are a carbon component in the form of at least one carbon source, for example graphite, as well as at least one binder component which endows the non-fired batch with sufficient strength. In addition, the batch may comprise further components, for example antioxidants in the form of metal powders formed from aluminium or silicon, in order to suppress oxidation of the carbon.

The base component of a batch for the production of a refractory magnesia-carbon product is a magnesia component in the form of at least one raw material based on MgO, for example sintered magnesia or fused magnesia.

The base component of a batch for the production of a refractory alumina-magnesia-carbon product is an alumina-magnesia component in the form of at least one raw material based on MgO or $Al_2O_3$, for example fused corundum, sintered corundum, bauxite, magnesia spinel, sintered magnesia or fused magnesia, wherein the raw materials for the magnesia-alumina component must comprise MgO as well as $Al_2O_3$.

Pitch or synthetic resins are regularly used as binders for batches for the production of refractory carbon-bonded products.

In order to provide the pitches, which are solids at room temperature, with the necessary viscosity for binding the components of the batch, batches with pitch as the binder, as a function of the softening point of the pitch, are mixed at temperatures in the range 130° C. to 170° C.

The batches blended with binder are then pressed into shaped articles in the form of green bodies and then tempered at about 200° C.

Heating the tempered green body to produce a refractory carbon-bonded product is usually carried out during normal operational use.

The graphic carbon matrix formed by coking the pitch results in high strength with simultaneous high flexibility of the refractory carbon-bonded product produced after firing. In this regard, refractory products which have been produced from a batch comprising pitch as the binder, exhibit good refractory properties. However, problems may be caused by the compounds which are released during pyrolysis of the pitch; among them in particular is benzo-a-pyrene ($C_{20}H_{12}$, "BaP"), which is a carcinogen.

This background shows that synthetic resins as binders for batches for the production of refractory carbon-bonded products are advantageous, since no benzo-a-pyrene escapes during pyrolysis thereof. In particular, synthetic resins as binders in batches for the production of refractory carbon-bonded products are known in the form of phenol resins, i.e. synthetic polycondensation products formed from phenol and formaldehyde which are therefore known as phenol-formaldehyde resins ("PF resins"). When using and heating resins of this type, in particular from temperatures in the range 200-700° C., offensive-smelling substances or substances which are hazardous to health may be formed, in particular, for example, aromatic substances, for example phenol or phenol derivatives. Synthetic resins of this type are divided into two basic types of synthetic resin. On the one hand there are the so-called resols (also known as "resol resins"), which can only be cured by increasing the temperature. On the other hand are the so-called novolacs (also known as "novolac resins") which require a chemical hardener, in particular hexamethylenetetramine, in order to be cured. Resols are usually liquid at room temperature and self-cure on the application of heat beyond approximately 100° C. Resols can thus be used directly as liquid binder components in batches without having to be pre-heated or dissolved in solvents. Novolacs are solids at room temperature. Novolacs can thus be used as binders in two manners: firstly, in the dissolved form, wherein organic solvents in particular are employed, or in the powdered form as so-called powder resin. It is also possible to melt the novolac at temperatures in the range 70° C. to 100° C. and to process the batch blended with the molten novolac during a heating operation.

Because of the strong three-dimensional cross-linking of the chains of molecules of the synthetic resin, the carbon does not graphitize when it is coked, whereupon the refractory carbon-bonded product produced from a batch of this type may have less strength and flexibility compared with a refractory carbon-bonded product of this type produced on the basis of a batch using pitch as the binder.

An advantage when pitch is used as the binder in batches for the production of a refractory carbon-bonded product, then, is that the refractory carbon-bonded products produced therefrom generally have very good refractory properties. However, the volatile benzo-a-pyrene which is produced during pyrolysis constitutes a disadvantage.

An advantage when synthetic resins are used as binders in batches for the production of refractory carbon-bonded products is, inter alia, that as a rule, no benzo-a-pyrene is released during its pyrolysis. Indeed, when heating batches comprising synthetic resins, in particular when heating to the service temperatures, other offensive-smelling substances or substances which are hazardous to health may be produced. Furthermore, the refractory properties of refractory products produced from a batch of this type may be poorer than products of this type which have been produced from a batch using pitch as the binder.

In EP 1 704 128 B1, a process is proposed in which carbon-bonded refractory products can be produced with benzo-a-pyrene contents of less than 50 mg/kg. In this regard, the proposed binder is on the one hand a coaltar pitch with a benzo-a-pyrene content of less than 500 mg/kg and on the other hand a liquid solution of this coaltar pitch in a highly aromatic oil.

The object of the invention is to provide a batch for the production of a refractory carbon-bonded product, which comprises a coking binder the pyrolysis of which does not release volatile substances which are hazardous to health or only releases small amounts thereof and from which at the same time, a refractory carbon-bonded product with refractory properties of this type can be produced the properties of which are at least on a par with the refractory properties of a refractory carbon-bonded product which has been produced on the basis of a batch in accordance with the prior art.

A further object of the invention is to provide a batch for the production of a refractory carbon-bonded product which is easy to process.

A further object of the invention is to provide a refractory carbon-bonded product with good refractory properties.

A further object of the invention is to provide a process for the production of a refractory carbon-bonded product of this type.

In accordance with the invention, a batch for the production of a refractory carbon-bonded product is provided, comprising the following components in the following proportions by weight, respectively with respect to the total weight of the product:

70% to 97% by weight of a base component;
1.0% to 2.3% by weight of a binder component in the form of at least one resol;
1.0% to 3.0% by weight of a binder component in the form of at least one pitch;
1.0% to 28% by weight of a carbon component in the form of at least one carbon source.

Surprisingly, in accordance with the invention, it has been discovered that a refractory carbon-bonded product with outstanding refractory properties can be produced from a batch which comprises the components described above in the proportions by weight described above wherein, because of the binder composition, pyrolysis thereof can to a great extent avoid the escape of volatile constituents which are hazardous to health. This is also because of the relatively small proportions of binder components in the form of at least one resol, wherein the respective advantageous properties of the binder components in the form of at least one resol and the at least one pitch supplement each other in the specific proportions of the invention.

In general, shaped articles which are produced from the batches of the invention undergo a maximum total weight loss in the temperature range between 200° C. and 700° C. of 1.5% by weight using thermogravimetry and an evaporation rate deduced therefrom of 150 ppm/min.

The proportions given herein as % by weight are with respect to the total weight of the batch, unless indicated otherwise.

Particularly preferably, the binder component is present in the form of the at least one pitch in the form of solid pitch, in particular in the form of a solid pitch in the form of coaltar pitch. Preferably, the pitch is highly softening, preferably with a softening point of more than 200° C. Preferably, the pitch has one or more of the following properties, wherein the figures are with respect to the respective pitch:

softening point over 200° C.;
benzo-a-pyrene content below 500 ppm, for example 300 to 500 ppm;
carbon residue using the Conradson method (in accordance with DIN 51551-1:2009-04) >75% by weight or >80% by weight;
D50 granulometry in the range 35 to 70 µm;
Loss on drying <0.5% by weight (at 110° C.);
ash content <0.4% by weight.

In a preferred embodiment, the binder in the form of at least one pitch may be a modified coaltar pitch marketed by Rutgers Basic Aromatics GmbH with the trade name CARBORES P.

The binder component in the form of at least one pitch may be one or more pitches; preferably, each of the pitches exhibits one or more of the properties given above.

The binder component in the form of at least one pitch may be present in the batch of the invention in a proportion of 1.0% to 3.0% by weight including, for example, in a proportion of at least 1.1% or 1.2% or 1.3% or 1.4% or 1.5% by weight and also, for example, in a proportion of at most 2.9% or 2.8% or 2.7% or 2.6% or 2.5% by weight.

The binder component in the form of at least one resol may comprise one or more resols. As is known, resols are soluble phenoplasts which contain reactive methylol groups. Preferably, the resols exhibit one or more of the following properties, wherein the figures given are with respect to the respective resol:

carbon residue >39% by weight (determined using the Conradson method in accordance with DIN 51551-1: 2009-04);
water content <20% by weight, for example 6-20% by weight;
free phenol content <15% by weight, for example 5-15% by weight;
non-volatile fraction >70% by weight, for example 70-80% by weight;
dynamic viscosity at 25° C.: 180-1400 mPas;
gelling time at 132° C.: 130-150 seconds.

If the binder component in the form of at least one resol comprises a plurality of resols, then preferably, each of the resols exhibits one or more of the properties given above.

The binder component in the form of the at least one resol is present in the batch in a proportion of 1.0% to 2.3% by weight including, so for example, also in a proportion of at least 1.1% or 1.2% or 1.3% or 1.4% or 1.5% by weight and also, for example, in a proportion of at most 2.2% or 2.1% or 2.0% by weight.

As discussed above, the advantageous properties of the batch given above are only produced when the components of the batch, in particular the binder components, are present in the batch in the proportions of the invention. In this regard, the invention has shown that not only the absolute values for the binder components but also their ratios by weight with respect to each other may be of significance. In this regard, in particular, the weight ratio of the binder component in the form of the at least one resol to the binder component in the form of at least one pitch is in the range 0.5 to 1.5, in particular in the range 0.6 to 1.4.

The base component of the batch of the invention consists of a magnesia component or an alumina-magnesia component. If the base component consists of a magnesia component, then the batch can be used for the production of a refractory magnesia-carbon product and if the base component consists of an alumina-magnesia component, then the batch can be used for the production of a refractory alumina-magnesia-carbon product.

The batch of the invention comprises a base component in a proportion of 70% to 97% by weight so, for example, also in a proportion of at least 72%, 74%, 76%, 78%, 80%, 81%, 82%, 83%, 84% or 85% by weight and also, for example, in a proportion of at most 96% or 95% by weight.

If the base component of the batch of the invention consists of a magnesia component, then this may be one or more raw materials based on MgO which may comprise batches for the production of a refractory magnesia-carbon product in accordance with the prior art. In this regard, a magnesia component may, for example, be in the form of at least one of the following raw materials based on MgO: fused magnesia or sintered magnesia.

If the base component of the batch of the invention consists of an alumina-magnesia component, then this may comprise one or more raw materials based on MgO or $Al_2O_3$ which can be used to produce batches for the production of a refractory alumina-magnesia-carbon product in accordance with the prior art. In this regard, an alumina-magnesia component may, for example, be in the form of at least one of the following raw materials based on MgO or $Al_2O_3$: fused corundum, sintered corundum, bauxite, magnesia spinel, sintered magnesia or fused magnesia, wherein the raw materials for the magnesia-alumina component must comprise MgO as well as $Al_2O_3$. In this regard, the magnesia alumina component may, for example, comprise just magnesia spinel as the raw material, since this includes both MgO and $Al_2O_3$. As an example, the magnesia alumina component may alternatively comprise fused corundum and fused magnesia, since these raw materials are formed on the one hand from $Al_2O_3$ and on the other hand from MgO.

In accordance with the prior art, in some cases it is necessary, in order to produce refractory carbon-bonded products, to use binders in the form of at least one novolac. As discussed above, for curing, novolacs require a hardener, in particular in the form of hexamethylenetetramine. The problem with using hexamethylenetetramine as a hardener, however, is that formaldehyde starts to break down at temperatures beyond approximately 100° C., which is not good on health grounds. The invention has now been able to show that it is not necessary to use novolacs in the batch of the invention. In this regard, in accordance with the invention, the batch of the invention does not contain any quantities of a binder component in the form of at least one novolac, or at least quantities of novolac of less than 0.5% by weight, in particular less than 0.4% or 0.3% or 0.2% or less than 0.1% by weight.

Regarding the carbon component is in the form of at least one carbon source, this may be one or more carbon sources which are used in batches of the same type in the prior art, in order to introduce into the batch the required quantity of carbon for forming a carbon bond. In this regard, for example, a carbon component in the form of at least one of the following carbon sources may be present: graphite or carbon black.

The carbon component in the form of at least one carbon source may be present in proportions of 1.0% to 28% by weight so also, for example, in proportions of at least 2%, 3%, 4% or 5% by weight and also, for example, in proportions of at most 27%, 26%, 25%, 24%, 23%, 22%, 21%, 20%, 19% or 18% by weight.

The batch of the invention may, for example, comprise a component in the form of one or more antioxidants as a further component, for example in the form of at least one of the following antioxidants: aluminium powder, silicon powder, aluminium-magnesium alloy powder, carbides or borides.

In addition to the components described above, namely a magnesia component in the form of at least one raw material based on MgO, a binder component in the form of at least one resol, a binder component in the form of at least one pitch, a carbon component in the form of at least one carbon source as well as a component in the form of antioxidants, the batch of the invention might not contain any further components or at most in proportions of less than 5% by weight including, for example, in proportions of less than 4%, 3%, 2% or less than 1% by weight.

In accordance with the invention, the batch may be used to produce any refractory carbon-bonded product, preferably for the production of a refractory magnesia carbon brick, i.e. a so-called MgO—C brick, or a refractory alumina-magnesia brick, i.e. a so-called AMC brick.

The inventive process for the production of a refractory carbon-bonded product comprises the following steps of the process:
  providing a batch in accordance with the invention;
  shaping the batch into a shaped article;
  tempering the shaped article;
  applying heat to the tempered shaped article in a manner such that the carbon of the binder components as well as of the carbon component forms a carbon bond in order to produce a refractory carbon-bonded product.

Shaping, tempering and heat application may be carried out as described in the prior art.

Preferably, the batch is shaped into a shaped article by pressing. A shaped article of this type is also known as a green body.

The shaped article or green body is then tempered, in particular in order to produce sufficient strength in the green body. Tempering is preferably carried out at temperatures in the range 150° C. to 250° C., in particular at approximately 200° C.

In accordance with the prior art, the tempered shaped article is then heat treated in a manner such that the carbon of the binder components, and in particular the carbon component as well, forms a carbon bond so that after the heat has been applied, a refractory carbon-bonded product is obtained.

This further application of heat may be carried out in accordance with the prior art, i.e. in particular at temperatures which are known in the art and at pressures which are known in the art. In this regard, the heat treatment may, for example, be carried out at temperatures in the range 1400° C. to 1700° C. and in reducing atmospheres.

As is known in the art, the application of heat to the tempered shaped article may in particular be carried out when the batch is being used, i.e. when the equipment which is supplied with the batch of the invention is being heated up.

A further object of the invention is a refractory carbon-bonded product which is produced by a process in accordance with the invention.

The refractory carbon-bonded product of the invention comprises particles or grains of the refractory base component—i.e. the magnesia component or the alumina-magnesia-component—, which is bonded by means of carbon bonding which is formed from the binder components and the carbon component during the application of heat. The grains of the magnesia component or the alumina-magnesia component may also be at least partially directly sintered together.

The refractory carbon-bonded product of the invention may, for example, comprise proportions of the following oxides in the following proportions by weight, respectively with respect to the total weight of the refractory carbon-bonded product, wherein these proportions may respectively be present individually or in combination:

(1) when the refractory carbon-bonded product is in the form of a magnesia-carbon product and thus has been produced on the basis of a base component in the form of a magnesia component:
MgO: 70%-98% by weight including, for example, 85-98% by weight;
carbon: 3%-30% by weight including, for example, 5-20% by weight;
$Al_2O_3$: <10% by weight including, for example, <8% by weight or 0.1-8% by weight;
$Fe_2O_3$: <2% by weight including, for example, <1% by weight or 0.1-1% by weight;
CaO: <3% by weight including, for example, <2% by weight or 1.0 to 2.0% by weight;
$SiO_2$: <3% by weight including, for example, <2% by weight or 0.1-2% by weight.

(2) When the refractory carbon-bonded product is in the form of an alumina-magnesia-carbon product and thus has been produced on the basis of a base component in the form of an alumina-magnesia component:
$Al_2O_3$: 50-98% by weight including, for example, 60-90% by weight;
carbon: 1-30% by weight including, for example, 5-20% by weight;
MgO: 1-49% by weight including, for example, 1-40% by weight;
$Fe_2O_3$: <2% by weight including, for example, <1% by weight or 0.1-1% by weight;
CaO: <3% by weight including, for example, <2% by weight or 1.0 to 2.0% by weight;
$SiO_2$: <6% by weight including, for example, <5% by weight, <4% by weight, <3% by weight, <2% by weight or 0.1-2% by weight.

In principle, the refractory carbon-bonded product of the invention may be used in any application for refractory carbon-bonded products. Particularly preferably, the refractory carbon-bonded product of the invention is used in the steel industry, particularly preferably for lining vessels that accommodate a steel melt. In this regard, the object of the invention also pertains to the use of the refractory carbon-bonded product of the invention for lining basic oxygen furnaces, electric arc furnaces, steel ladles or for slide gates.

Further features of the invention are given in the claims, the figures, the accompanying description of the figures as well as in the exemplary embodiments described below.

All of the features of the invention may be combined in any manner, individually or in combination.

Table 1 below lists three exemplary embodiments batches in accordance with the invention, denoted V1, V2 and V3. Furthermore, Table 1 lists three prior art batches denoted S1, S2 and S3. Batches V1, V2, S1, S2 are batches with a base component in the form of fused magnesia and thus are batches for the production of a magnesia-carbon product; in contrast, batches V3 and S3 are batches with a base component in the form of fused magnesia and fused alumina, and thus are batches for the production of an alumina-magnesia-carbon product.

TABLE 1

| Component | V1 | V2 | V3 | S1 | S2 | S3 |
|---|---|---|---|---|---|---|
| Fused magnesia | 88.0 | 91.5 | 4.0 | 88.2 | 91.7 | 4.0 |
| Fused alumina | | | 87.5 | | | 87.2 |
| Resol | 1.5 | 2.3 | 2.3 | 2.8 | 2.8 | 3.0 |
| Novolac + HMT* | | | | | | 1.3 |
| solid pitch | 2.5 | 1.7 | 1.7 | 1.0 | 1.0 | |
| Graphite | 8.0 | 4.5 | 4.5 | 8.0 | 4.5 | 4.5 |

*HMT = hexamethylenetetramine

The figures given above are as a % by weight with respect to the respective total weight of the batch.

The granulometry of the fused magnesia was >0 to 6 mm. The proportion of MgO in the fused magnesia was 97.4% by weight with respect to the fused magnesia. In addition, the fused magnesia had the following proportions of oxides, respectively with respect to the total weight of the fused magnesia: CaO: 1.2% by weight; $SiO_2$: 0.5% by weight; $Fe_2O_3$: 0.8% by weight; $Al_2O_3$: 0.1% by weight. The bulk density of the fused magnesia was 3.47 g/cm$^3$.

The granulometry of the fused alumina was >0 to 7 mm. The proportion of $Al_2O_3$ was 99.6% by weight with respect to the fused alumina. In addition, the fused alumina had the following proportions of oxides, respectively with respect to the total weight of the fused alumina: $SiO_2$: 0.06% by weight; CaO: 0.03% by weight; $Fe_2O_3$: 0.09% by weight; MgO: 0.08% by weight; $TiO_2$: 0.01% by weight; $Na_2O$: 0.16% by weight. The bulk density of the fused alumina was 3.65 g/cm$^3$.

The binder component in the form of resol had the following properties: 12.4% by weight of free phenol (in accordance with DIN EN ISO 8974); Conradson carbon yield (in accordance with DIN 51551-1: 2009-04): 40% by weight; non-volatile fractions at 135° C. (in accordance with DIN EN ISO 3251): 71% by weight; Karl Fischer water content (in accordance with DIN 53715): 11% by weight; B-time at 150° C. (in accordance with DIN EN ISO 8987): 150 s; Floppier viscosity at 20° C. (in accordance with DIN EN ISO 12058-1): 530 mPaS.

The binder component in the form of modified coaltar pitch was a commercially available solid pitch with a softening point of 235° C. (in accordance with DIN 51920: 2012-12), a Conradson carbon residue (in accordance with DIN 51551-1:2009-04)>80% by weight, a benzo-a-pyrene content of <500 ppm, a D50 granulometry in the range 35-70 µm, a loss on drying (at 110° C.; in accordance with DIN 51078:2002-12) of <0.5% by weight, as well as an ash content of <0.4% by weight.

The carbon source in the form of graphite had a granulometry of <1.0 mm and with a carbon content of >94% by weight with respect to the carbon source.

The corresponding batches which were produced were mixed at room temperature and shaped into shaped articles using hydraulic pressure in the range 100 to 300 MPa in the shape of unfired magnesia-carbon products in a 230×114×70 mm format. After shaping, the shaped articles were heat treated ("tempered") at a temperature of 200° C., at a heating rate of 50° C./h for 6 h in order to cure the resol resin component or the novolac component. The tempered unfired shaped articles which were formed (hereinafter "products") then underwent thermogravimetric characterization without further treatment (TGA: in accordance with DIN 51006: 2006-07) and pyrolysis with gas chromatography.

The test apparatus used for TGA was a "TA06" type apparatus from Mettler-Toledo.

For the TGA, cubic specimens with 12 mm sides were cut from the products mentioned above and heated to a final temperature of 700° C. with the exclusion of oxygen and in a nitrogen atmosphere at a heating rate of 2° C./min. In this test, initially, volatile constituents evaporated off, such as water and free phenol, in the temperature range to approximately 200/300° C. In the following temperature range of 300° C. to 700° C., pyrolytic decomposition of the resol or novolac occurred with simultaneous formation of a carbon matrix and release of thermal decomposition products of the resol resin or the novolac such as phenol, ortho-, meta and para-cresol, various xylenols and trimethylphenol. During heating of the specimens, the total weight loss as well as the evaporation rate of the volatile constituents were quantified. The measurements obtained therefrom are shown in FIGS. 1, 2, 3, 4, 5 and 6.

FIG. 1 shows the total weight loss for the specimens from the products from batches V1 and S1 measured by TGA. The Y axis shows the total weight loss as a % by weight as a function of the temperature in ° C. along the X axis. The 700° C. curves show, from top to bottom, the values for the products produced from batches V1 and S1. FIG. 1 clearly shows that the total weight loss of the product V1 produced from the batch V1 of the invention is substantially smaller than that from the corresponding product produced from the prior art batch S1.

FIG. 2 shows the evaporation rates for the samples from the products from batches V1 and S1 derived from the TGA. The Y axis shows the evaporation rate in ppm/min as a function of the temperature in ° C. along the X axis. The curves at 450° C. show, from top to bottom, the values for the products produced from batches V1 and S1. It can again clearly be seen that the evaporation rates for the product V1 produced from the batch V1 of the invention (−100 ppm) is substantially smaller than that for product S1 (−298 ppm), which was produced from the prior art batch S1.

FIG. 3 shows the total weight loss of the samples of the products from batches V2 and S2 measured by TGA. The Y axis shows the total weight loss as a % by weight as a function of the temperature in ° C. along the X axis. The 700° C. curves show, from top to bottom, the values for the products produced from batches V2 and S2. FIG. 3 clearly shows that the total weight loss of the product V2 produced from the batch V2 of the invention is substantially smaller than that from the corresponding product produced from the prior art batch S2.

FIG. 4 shows the evaporation rates for the samples from the products from batches V2 and S2 derived from the TGA. The Y axis shows the evaporation rate in ppm/min as a function of the temperature in ° C. along the X axis. The curves at 450° C. show, from top to bottom, the values for the products produced from batches V2 and S2. It can again clearly be seen that the evaporation rates for the product V2 produced from the batch V2 of the invention (−115 ppm) is substantially smaller than that for product S2 (−317 ppm), which was produced from the prior art batch S2.

FIG. 5 shows the total weight loss of the samples of the products from batches V3 and S3 measured by TGA. The Y axis shows the total weight loss as a % by weight as a function of the temperature in ° C. along the X axis. The 700° C. curves show, from top to bottom, the values for the products produced from batches V3 and S3. FIG. 5 clearly shows that the total weight loss of the product V3 produced from the batch V3 of the invention is substantially smaller than that from the corresponding product produced from the prior art batch S3.

FIG. 6 shows the evaporation rates for the samples from the products from batches V3 and S3 derived from the TGA. The Y axis shows the evaporation rate in ppm/min as a function of the temperature in ° C. along the X axis. The curves at 450° C. show, from top to bottom, the values for the products produced from batches V3 and S3. It can again clearly be seen that the evaporation rates for the product V3 produced from the batch V3 of the invention (−76 ppm) is substantially smaller than that for product S3 (−120 ppm), which was produced from the prior art batch S3.

In general, the maximum evaporation rate for products produced from batches in accordance with the invention is less than 150 ppm/min.

In order to determine the physical test values of bulk density, porosity and cold compression strength, specimens from the products mentioned above were heat treated at 1000° C. with the exclusion of oxygen in order to ensure complete carbonizing of the binder and thus a practical determination of the properties for service at high temperatures (in accordance with the standard noted below). Next, the bulk density, porosity and cold compression strength of the coked specimens obtained in this manner were determined in accordance with the standards given below.

FIG. 7 shows the bulk density of the specimens obtained from the products, namely—from left to right—the specimen from batch V1, S1, V2, and S2. The Y axis shows the respective bulk density in g/cm$^3$.

FIG. 8 shows the bulk density of the specimens obtained from the products, namely—from left to right—the specimen from batch V3 and S3. The Y axis shows the respective bulk density in g/cm$^3$.

FIG. 9 shows the open porosity of the specimens obtained from the products, namely—from left to right—the specimen from batch V1, S1, V2, and S2. The Y axis shows the respective porosity as a % by volume.

FIG. 10 shows the open porosity of the specimens obtained from the products, namely—from left to right—the specimen from batch V3 and S3. The Y axis shows the respective porosity as a % by volume.

FIG. 11 shows the cold compression strength of the specimens obtained from the products, namely—from left to right—the specimen from batch V1, S1, V2, and S2. The Y axis shows the respective cold compression strength in N/mm$^2$.

FIG. 12 shows the cold compression strength of the specimens obtained from the products, namely—from left to right—the specimen from batch V3 and S3. The Y axis shows the respective cold compression strength in N/mm$^2$.

Coking of the specimens was carried out in accordance with EN 993-1:1997. The values for the bulk density and open porosity were determined in accordance with EN 993-1:1995 and the cold compression strength was determined in accordance with EN 993-5:1998.

FIGS. 7 to 12 show that the properties of products V1, V2 and V3 produced from the batches of the invention partly exceed or are at least comparable with those of products S1, S2 and S3 produced from prior art batches.

Figure 1:
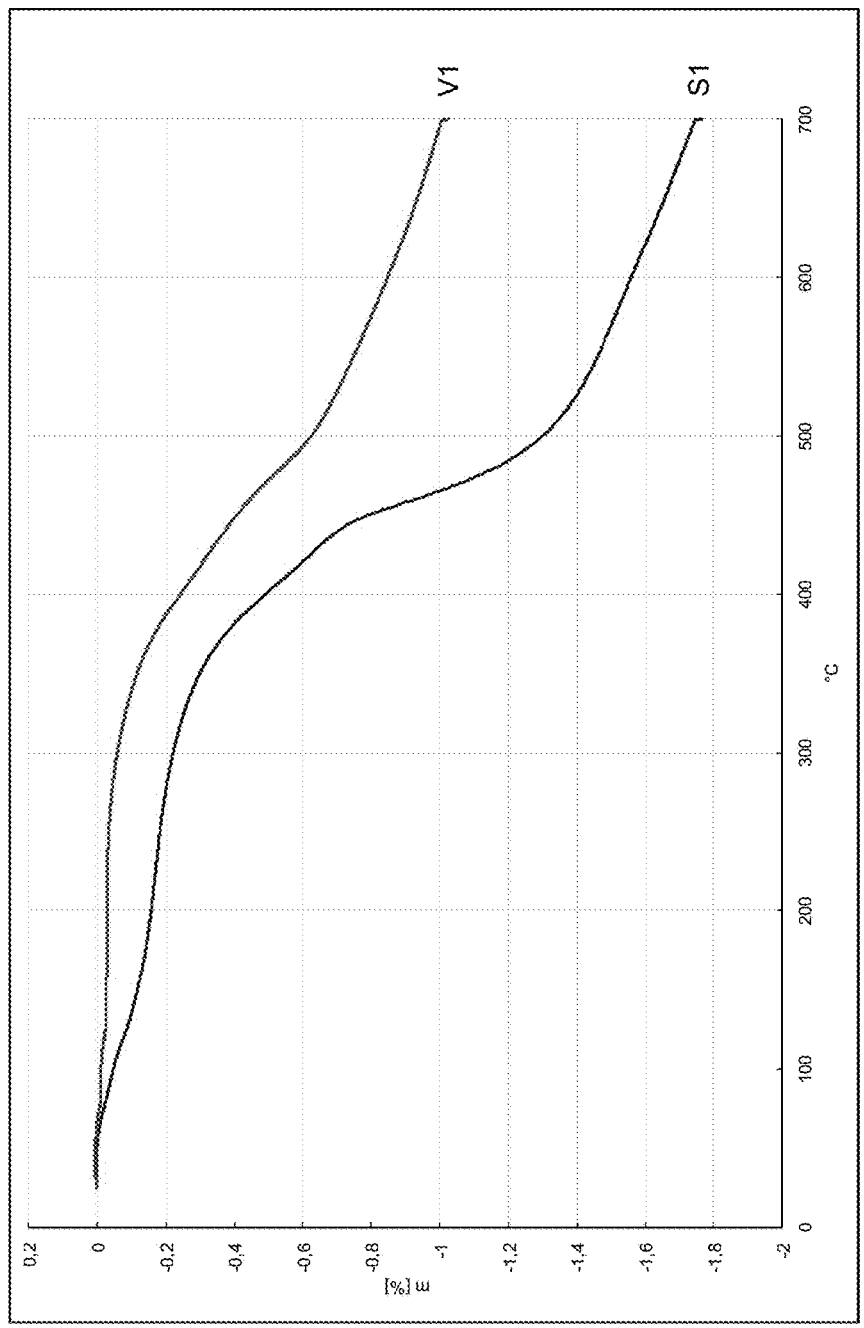
Figure 2:
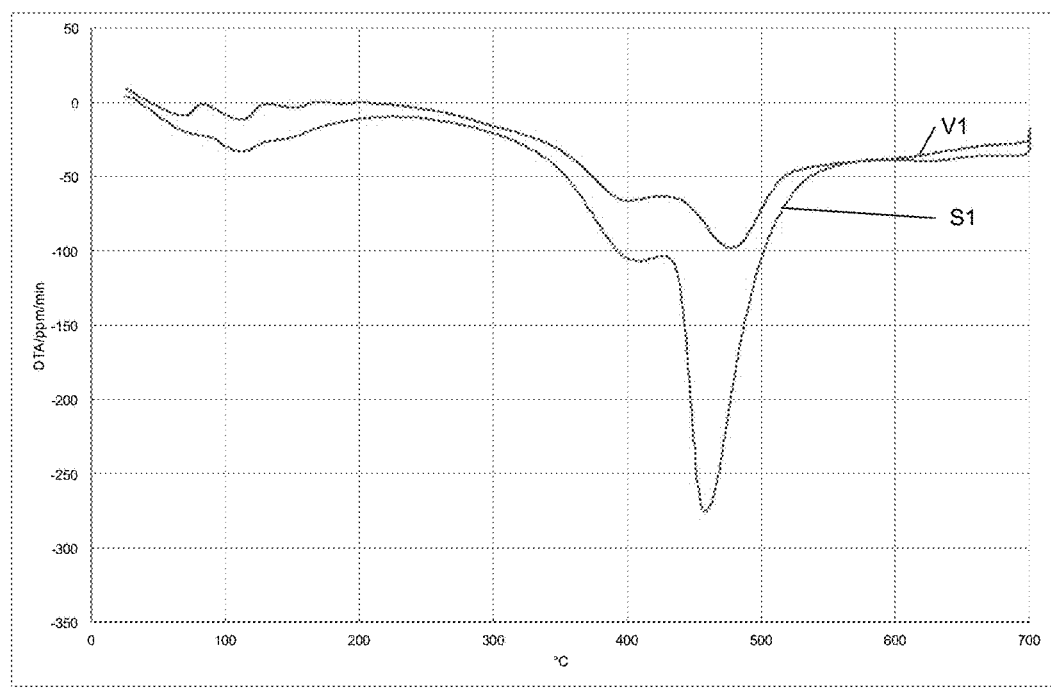
Figure 3:
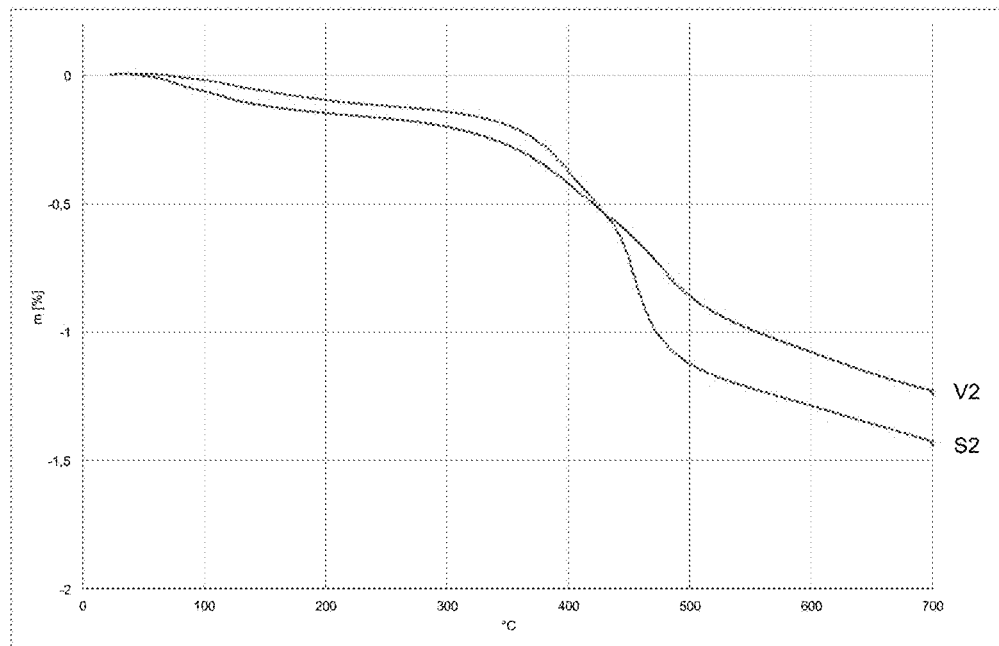
Figure 4:
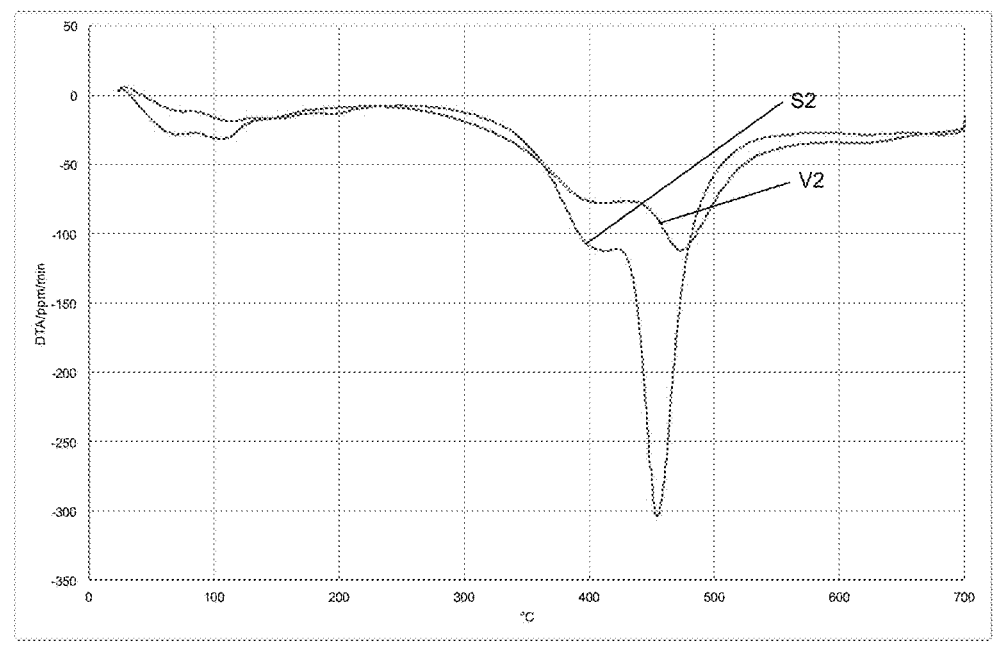
Figure 5:
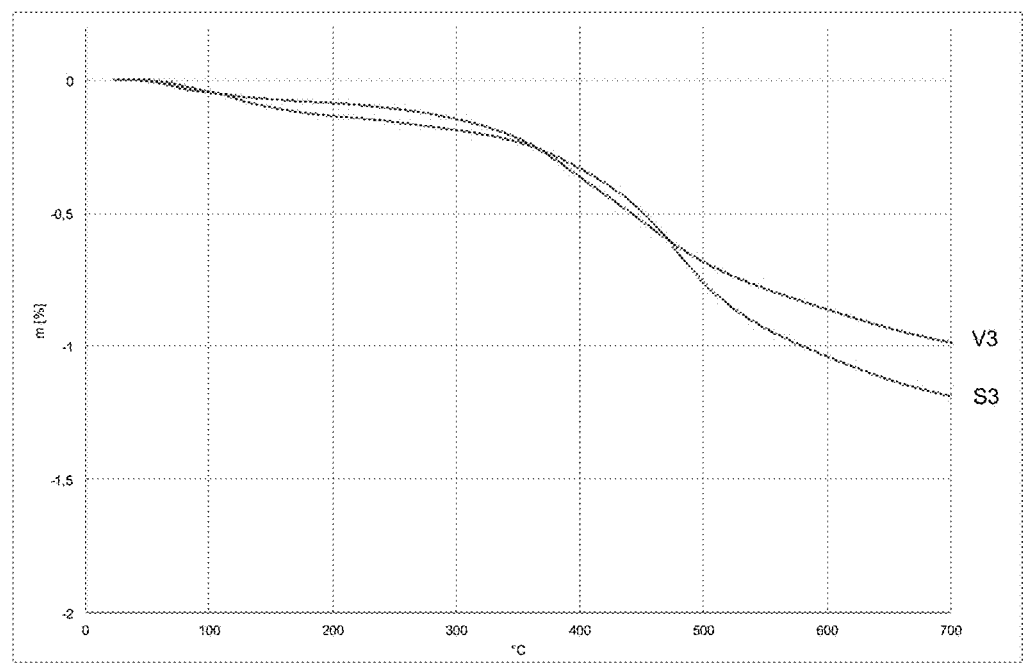
Figure 6:
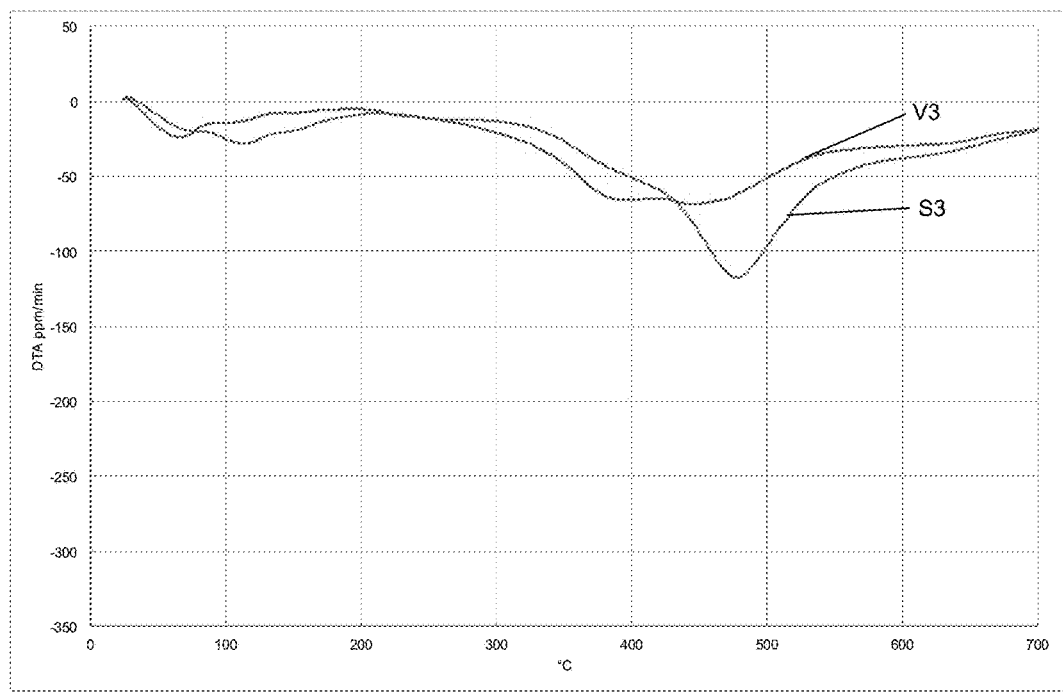
Figure 7:
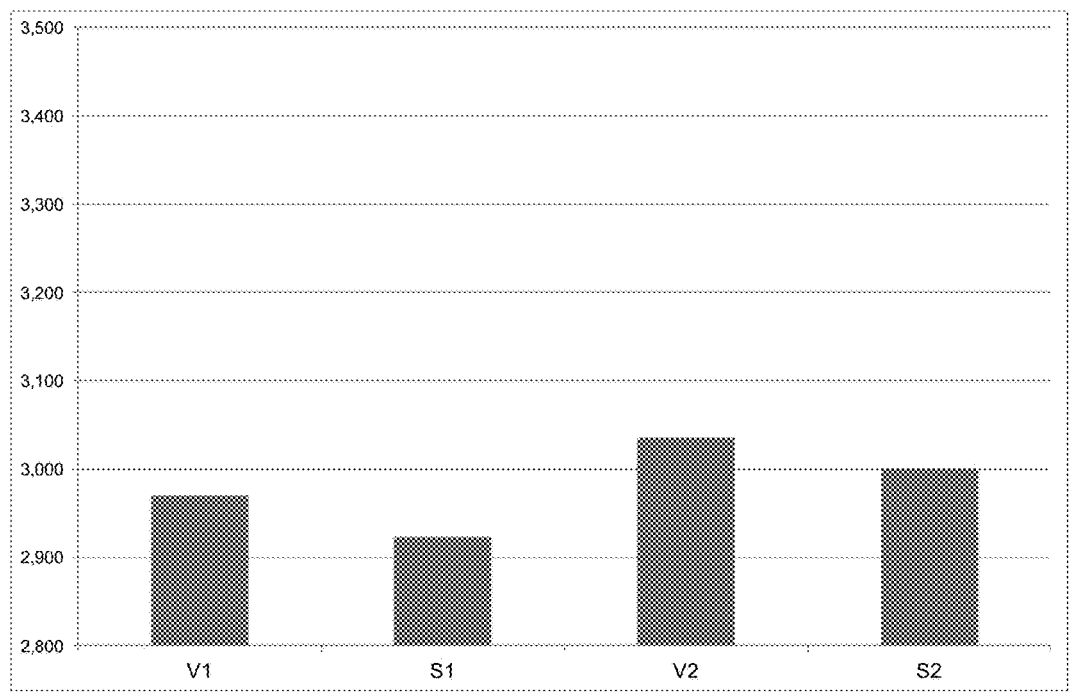
FIGS. 7, 8, 9, 10, 11 and 12 show the bulk density, porosity and cold compression strength for the specimens obtained after coking.
Figure 8:
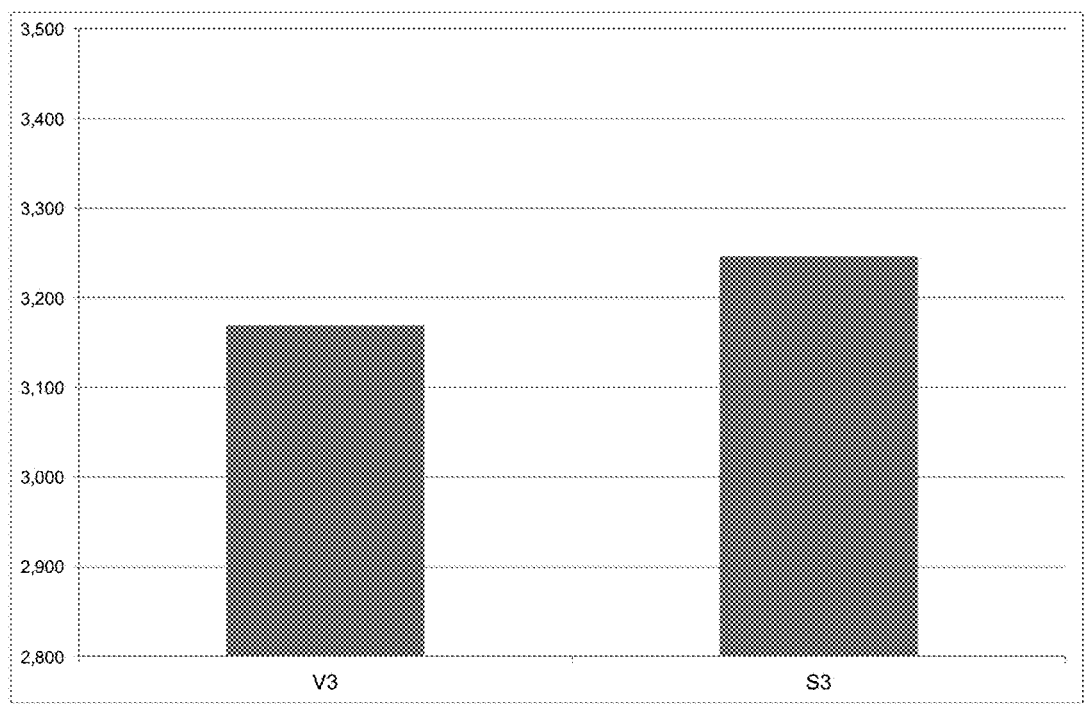
Figure 9:
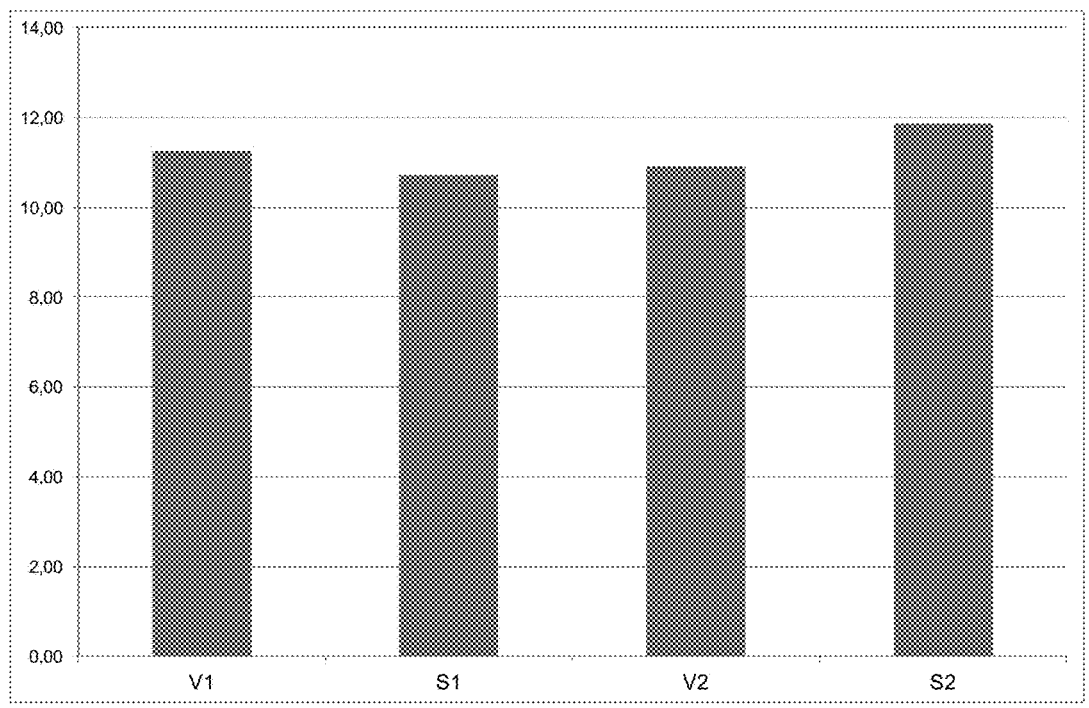
Figure 10:
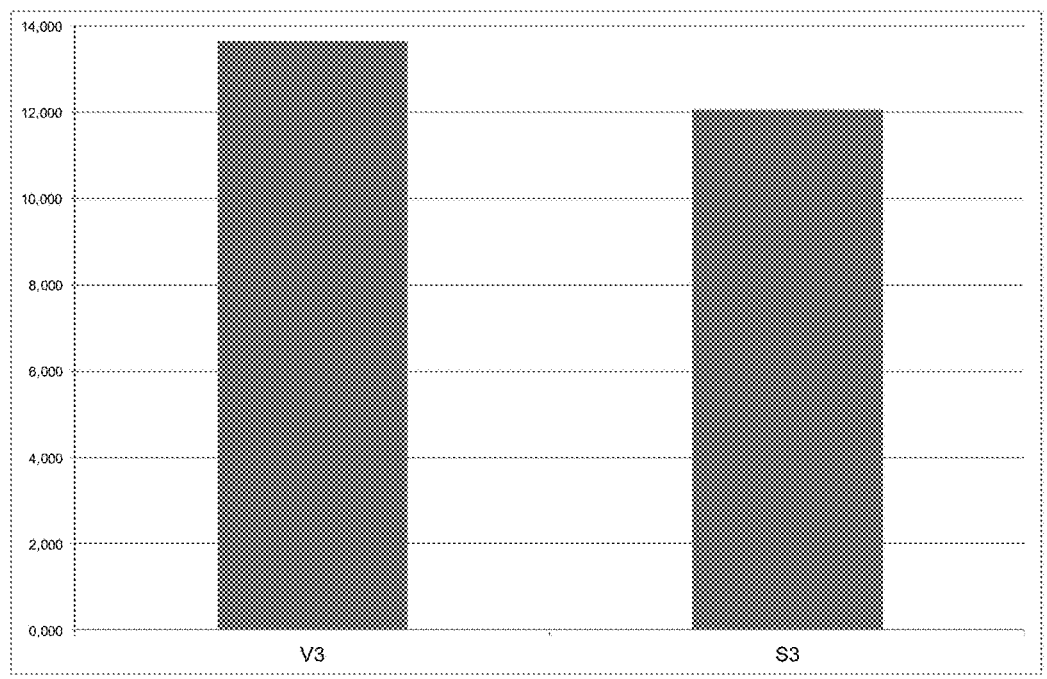
Figure 11:
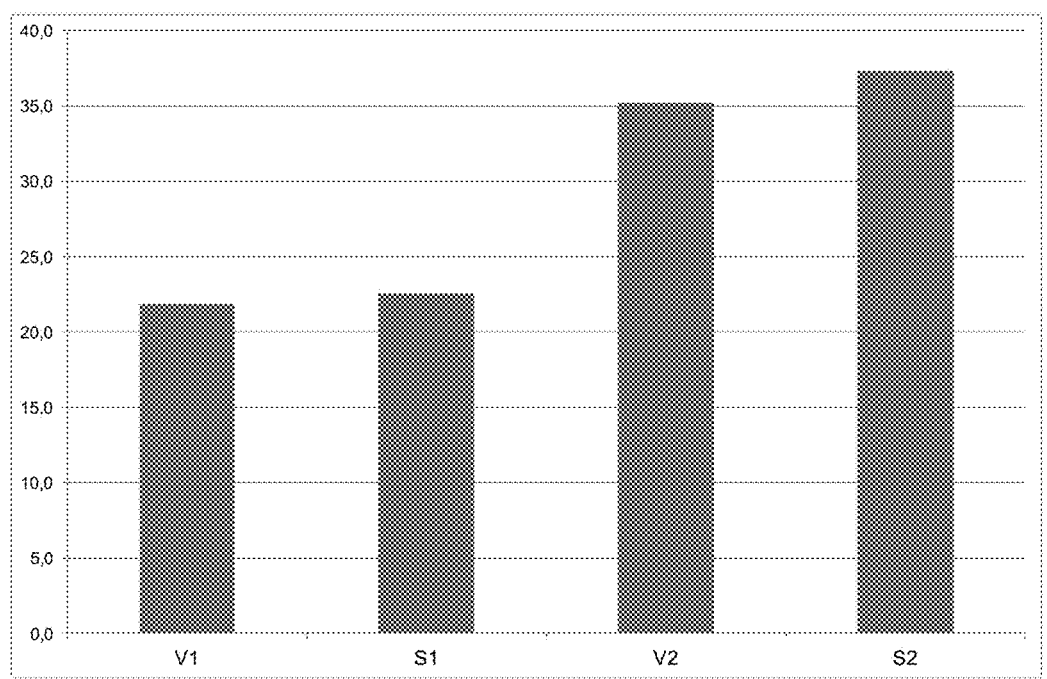
Figure 12:
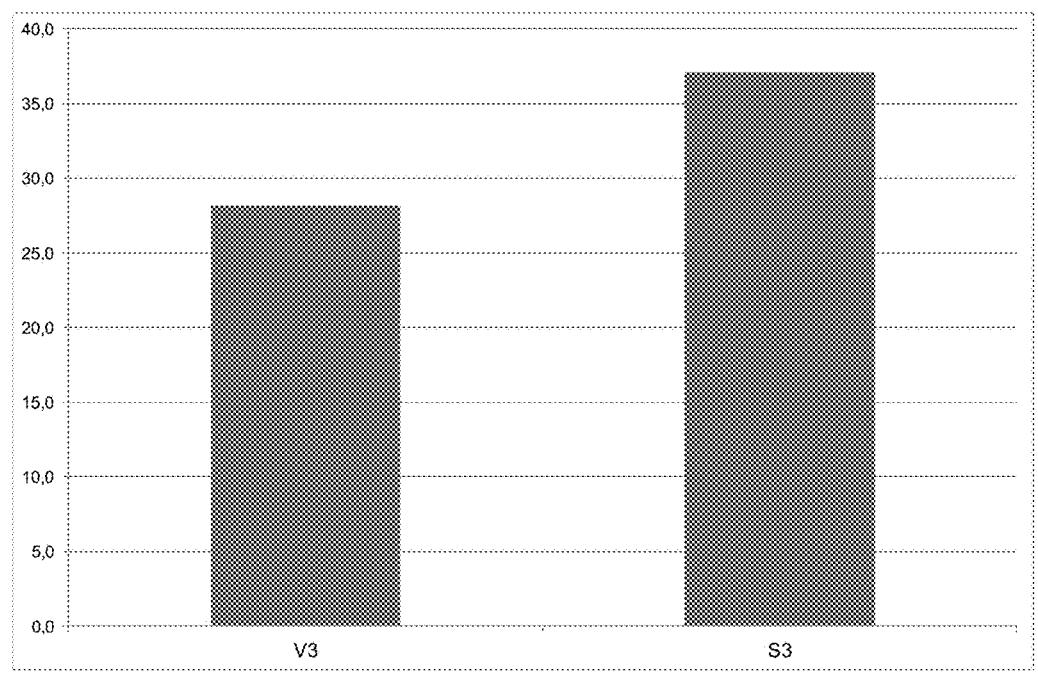
Figure 13:
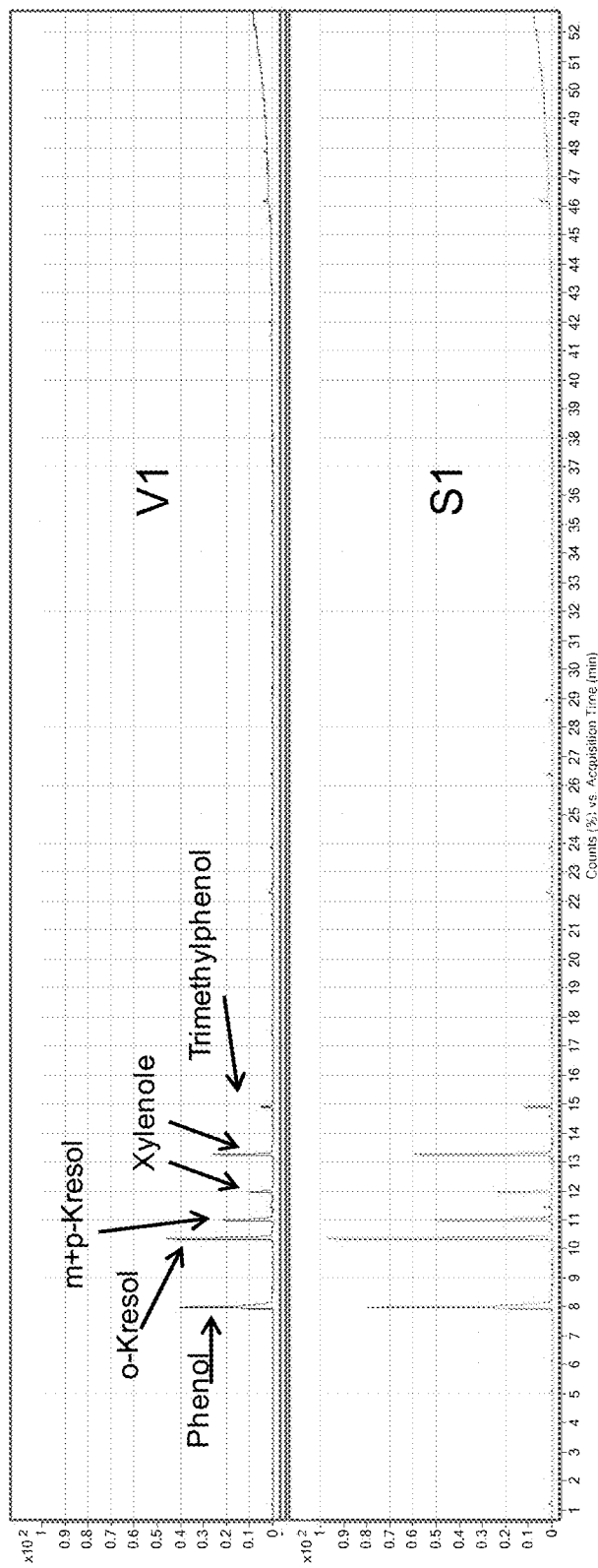
Figure 14:
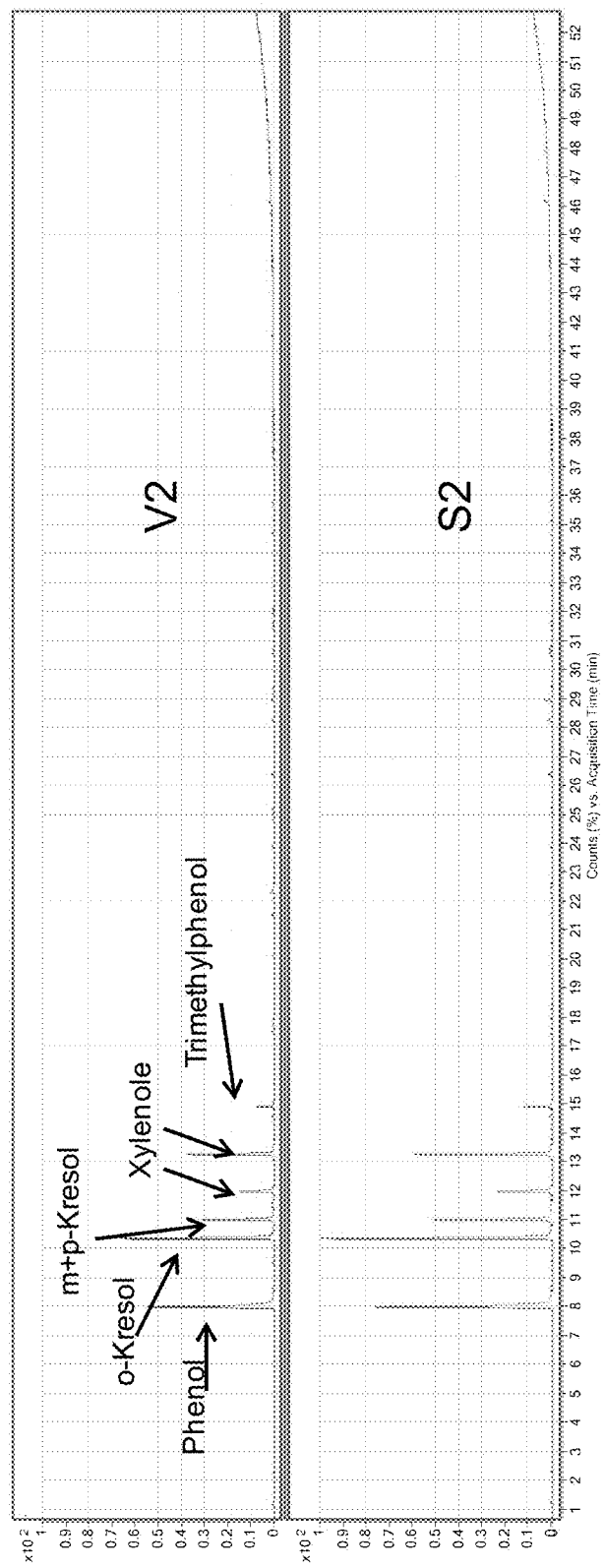
Figure 15:
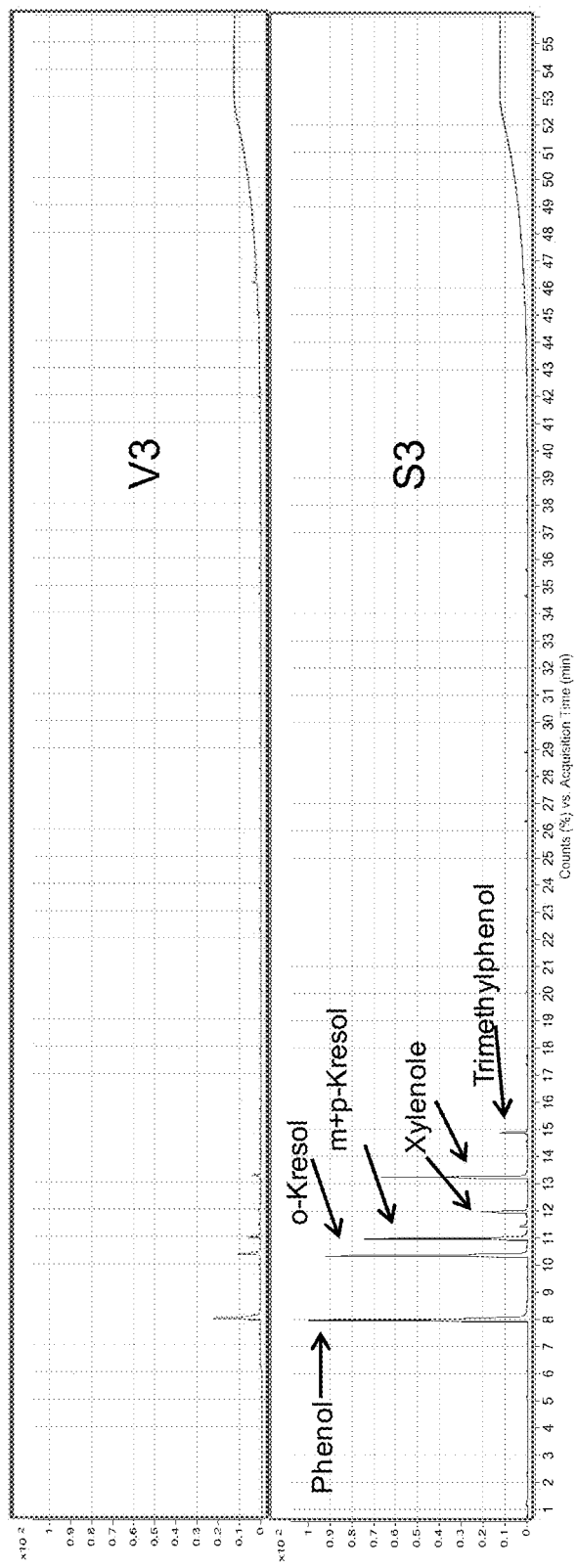

FIGS. 13 to 15 show exemplary chromatograms.

In order to characterize the offensive-smelling compounds or compounds which are hazardous to health obtained on heating the products produced from batches V1, V2, V3, S1, S2 and S3, the products were tested by gas chromatography using pyrolysis-GC-MS. Based on the maximum evaporation rate from the TGA, the pyrolysis temperature was set at 500° C., since in this temperature range, stronger emissions from the thermal decomposition of the resol resin or novolac can be expected. The corresponding chromatograms are shown in FIGS. 13, 14 and 15. It is clear that upon pyrolysis at this temperature, compounds are emitted which almost exclusively derive from the structure of the resol or the novolac. This behaviour is typical for a chemically pure resol resin or a chemically pure novolac and to be expected for any product produced with resol and/or novolac as the binder. In addition, it should be noted that the emitted quantities of offensive-smelling compounds or compounds which are hazardous to health (phenol, o-cresol, m-cresol, p-cresol, various xylenols, trimethylphenol) with the products produced from batches V1, V2 and V3 of the invention are substantially smaller than those from prior art batches S1, S2 and S3.

The invention claimed is:

1. A batch for the production of a refractory carbon-bonded product, comprising the following components in the following proportions by weight, respectively with respect to the total weight of the product:
    70% to 97% by weight of a base component;
    1.0% to 2.3% by weight of a binder component in the form of at least one resol;
    1.5 to 3% by weight of a binder component in the form of at least one pitch;
    1.0% to 28% by weight of a carbon component in the form of at least one of the following carbon sources: graphite or carbon black.

2. The batch as claimed in claim 1, having a binder component in the form of at least one pitch in the form of coaltar pitch.

3. The batch as claimed in claim 1, having a base component formed by a magnesia component or an alumina-magnesia component.

4. The batch as claimed in claim 3, having a magnesia component in the form of at least one of the following MgO-based raw materials: fused magnesia or sintered magnesia.

5. The batch as claimed in claim 3, having an alumina-magnesia component in the form of at least one of the following MgO- or $Al_2O_3$-based raw materials: fused corundum, sintered corundum, bauxite, magnesia spinel, sintered magnesia or fused magnesia, wherein the raw materials comprise MgO as well as $Al_2O_3$.

6. The batch as claimed in claim 1, having a proportion of solid resin of less than 0.5% by weight.

7. A process for the production of a refractory carbon-bonded product, comprising the following steps:
    providing a batch, the batch comprising the following components in the following proportions by weight, respectively with respect to the total weight of the product:
        70% to 97% by weight of a base component;
        1.0% to 2.3% by weight of a binder component in the form of at least one resol;
        1.5 to 3% by weight of a binder component in the form of at least one pitch;
        1.0% to 28% by weight of a carbon component in the form of at least one of the following carbon sources: graphite or carbon black;
    shaping the batch into a shaped article;
    tempering the shaped article; and
    applying heat to the tempered shaped article in a manner such that the carbon of the binder components as well as of the carbon component forms a carbon bond in order to produce a refractory carbon-bonded product.

8. A refractory carbon-bonded product produced by a process, the process comprising:
    providing a batch, the batch comprising the following components in the following proportions by weight, respectively with respect to the total weight of the product:
        70% to 97% by weight of a base component;
        1.0% to 2.3% by weight of a binder component in the form of at least one resol;
        1.5 to 3% by weight of a binder component in the form of at least one pitch;
        1.0% to 28% by weight of a carbon component in the form of at least one of the following carbon sources: graphite or carbon black;
    shaping the batch into a shaped article;
    tempering the shaped article; and
    applying heat to the tempered shaped article in a manner such that the carbon of the binder components as well as of the carbon component forms a carbon bond in order to produce a refractory carbon-bonded product.

* * * * *